US010691162B2

(12) United States Patent
Guthaus et al.

(10) Patent No.: US 10,691,162 B2
(45) Date of Patent: Jun. 23, 2020

(54) SYSTEM AND METHOD FOR A HYBRID CURRENT-MODE AND VOLTAGE-MODE INTEGRATED CIRCUIT

(71) Applicant: The Regents of the University of California, Oakland, CA (US)

(72) Inventors: Matthew Guthaus, Santa Cruz, CA (US); Riadul Islam, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/436,130

(22) Filed: Jun. 10, 2019

(65) Prior Publication Data

US 2019/0384349 A1    Dec. 19, 2019

Related U.S. Application Data

(60) Provisional application No. 62/685,733, filed on Jun. 15, 2018.

(51) Int. Cl.
| | |
|---|---|
| *G06F 1/10* | (2006.01) |
| *H03K 5/1534* | (2006.01) |
| *G06F 30/392* | (2020.01) |
| *G06F 30/394* | (2020.01) |
| *G06F 30/396* | (2020.01) |
| *G06F 111/04* | (2020.01) |

(52) U.S. Cl.
CPC .............. *G06F 1/10* (2013.01); *G06F 30/392* (2020.01); *G06F 30/394* (2020.01); *H03K 5/1534* (2013.01); *G06F 30/396* (2020.01); *G06F 2111/04* (2020.01)

(58) Field of Classification Search
CPC combination set(s) only.
See application file for complete search history.

(56) References Cited

U.S. PATENT DOCUMENTS 7,483,688 B2 * 1/2009 Huang ................... H04M 9/00
                                                       375/219
9,787,293 B2 * 10/2017 Guthaus ................. G05F 3/262

* cited by examiner

*Primary Examiner* — An T Luu
(74) *Attorney, Agent, or Firm* — Venable LLP; Henry J. Daley; Ryan T. Ward (57) ABSTRACT

Systems and methods for a hybrid current-mode to voltage-mode integrated circuit. An example integrated circuit embodiment configured according to this disclosure can include: a clock circuit and a logic circuit operatively synchronized with said clock circuit, where the logic circuit has a plurality of sub-circuits. The clock circuit can include a current-mode network tree and a plurality of current-mode-to-voltage-mode converters, each current-mode-to-voltage-mode converter in the plurality of current-mode-to-voltage-mode converters being electrically connected to the current-mode network tree, and each current-mode-to-voltage-mode converter in the plurality of current-mode-to-voltage-mode converters being associated with a respective one of the plurality of sub-circuits. The clock circuit can also include a global current mode transmitter electrically connected to the current-mode network tree, where the global current mode transmitter provides a current-mode clock signal to each of the plurality of current-mode-to-voltage-mode converters.

20 Claims, 6 Drawing Sheets

SYSTEM AND METHOD FOR A HYBRID CURRENT-MODE AND VOLTAGE-MODE INTEGRATED CIRCUIT

CROSS-REFERENCE TO RELATED APPLICATIONS

This application claims priority benefit from U.S. provisional patent application No. 62/685,733, filed on Jun. 15, 2018, the entire content of which is incorporated herein by reference. All references cited anywhere in this specification, including the Background and Detailed Description sections, are incorporated by reference as if each had been individually incorporated.

BACKGROUND

1. Technical Field

The present disclosure relates to clocking mechanisms for integrated circuits, and more specifically to a hybrid integrated circuit with both current-mode and voltage-mode clock distribution and methods of production and design.

2. Introduction

In a high-performance VLSI (Very Large Scale Integration) design for an Integrated Circuit (IC), the clock network can consume a significant amount of power. Most existing logic components within ICs are clocked based on voltage-mode (VM) signals. These voltage-mode signals provide, as inputs to the logic components, signals based on a voltage difference, either between two input signals (a differential signal) or between the input and ground. However, such clock distribution networks (CDNs) lose a tremendous amount of dynamic power to charge/discharge the large global clock capacitance.

VM CDNs require clock buffers to ensure that the clock signal arrives at each respective logic component simultaneously. However, the placement of these buffers can disturb timing and require improved clock synthesis methodologies to tackle skew and variability. A current-mode (CM) clocking system does not need distributed buffers, and can improve design aspects such as process variation and noise related timing uncertainty. As such, CM is widely used for global signaling, especially in high-speed serial links for network buses, memory buses, and multiprocessor interconnection networks. However, at low frequencies, CM signaling consumes large overall power due to the high static power consumption—the opposite of VM signaling, which has low static power.

While new circuit approaches have been suggested for current-mode (CM) clocking which have some advantages, such solutions are not universally applicable. For example, while proposed CM CDNs may significantly reduce clock power consumption, such approaches are limited to only symmetric networks, whereas most application specific integrated circuits have asymmetric clock distributions. In addition, the CM schemes currently available do not consider jitter-induced skew within the CDN. Finally, many of the CM CDNs available fail to consider the local clock pins of the logic components, which may require buffers to drive the final VM flip-flops.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example integrated circuit embodiment configured according to this disclosure can include: a clock circuit and a logic circuit operatively synchronized with said clock circuit, where the logic circuit has a plurality of sub-circuits. The clock circuit can include a current-mode network tree and a plurality of current-mode-to-voltage-mode converters, each current-mode-to-voltage-mode converter in the plurality of current-mode-to-voltage-mode converters being electrically connected to the current-mode network tree, and each current-mode-to-voltage-mode converter in the plurality of current-mode-to-voltage-mode converters being associated with a respective one of the plurality of sub-circuits. The clock circuit can also include a global current mode transmitter electrically connected to the current-mode network tree, where the global current mode transmitter provides a current-mode clock signal to each of the plurality of current-mode-to-voltage-mode converters.

An example method for creating a hybrid clock distribution network according to the concepts disclosed herein can include receiving, at a processor, a clock tree circuit, the clock tree circuit identifying centroid locations within an integrated circuit design of a plurality of circuit components requiring a voltage clock input, and receiving, at the processor, a slew constraint. The method can further include dividing the clock tree circuit into a local tree and a global tree and generating, using the local tree and common connection length between locations of the plurality of circuit components, an equal height tree. The method can further include buffering a local voltage-mode network associated with the local tree based on the equal height tree, to yield a buffered clock-tree synthesis, and assigning, for each centroid location in the centroid locations, an equal height level for a current-mode clock distribution through the global tree. The method can then include placing a current-mode to voltage-mode receiver at each centroid location in the centroid locations, to yield current-mode to voltage-mode receiver placements, recursively computing a total admittance and a skew value for the integrated circuit design with the current-mode to voltage-mode receiver placements by varying current-mode inputs to respective current-mode to voltage-mode receiver placements until a lowest skew is found, at which point the current-mode inputs for that iteration are identified, to yield identified current-mode inputs, and connecting, via the processor and within the integrated circuit design, each centroid location to a corresponding RX placement using the identified current-mode inputs and the slew constraint.

Another example method for creating a hybrid clock distribution network can include: identifying, via a processor and for an initial integrated circuit, a voltage-mode clock; sizing, via the processor and for the initial integrated circuit, a conversion of the voltage-mode clock to a current-mode clock for distribution through an H-tree current-mode network on the initial integrated circuit, to yield a transmission circuit size; sizing, via the processor and for the initial integrated circuit and based on the transmission circuit size, conversions of the current-mode clock to localized voltage-mode clocks for respective sub-circuits of individual voltage-mode flip-flops on the initial integrated circuit, to yield a receiver circuit size; modifying, via the processor, the initial integrated circuit based on the transmission circuit size and the receiver circuit size, to yield an updated integrated circuit; and fabricating the updated integrated circuit.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The hybrid clocking scheme disclosed herein uses global CM clocking to protect CDN against noise and jitter issues, converts the CM clock to VM for specific sub-circuits within the IC, then drives the VM clock to the logic components using buffers for the VM clock when necessary. The disclosed hybrid clocking scheme uses current CM to VM conversion circuits, also known as "CM Rx circuits" (which receive the CM clock and convert it to a local VM clock for a sub-circuit) to convert the current-mode clock to a voltage-mode clock. This enables full-swing output voltage for the VM buffers and the local VM logic for a sub-circuit. Typically, the IC will have an oscillator that produces a VM clock. The VM clock is converted to the CM mode for global distribution. The production of the initial VM clock can be performed via a VM-CM conversion circuit, also known as a "CM Tx circuit" (because it transmits the CM clock to the global clock network). For each individual sub-circuit that includes logic components that require a VM signal, an Rx circuit will convert the global CM clock (the output from the CM Tx circuit) to a local VM clock.

Figure 1:
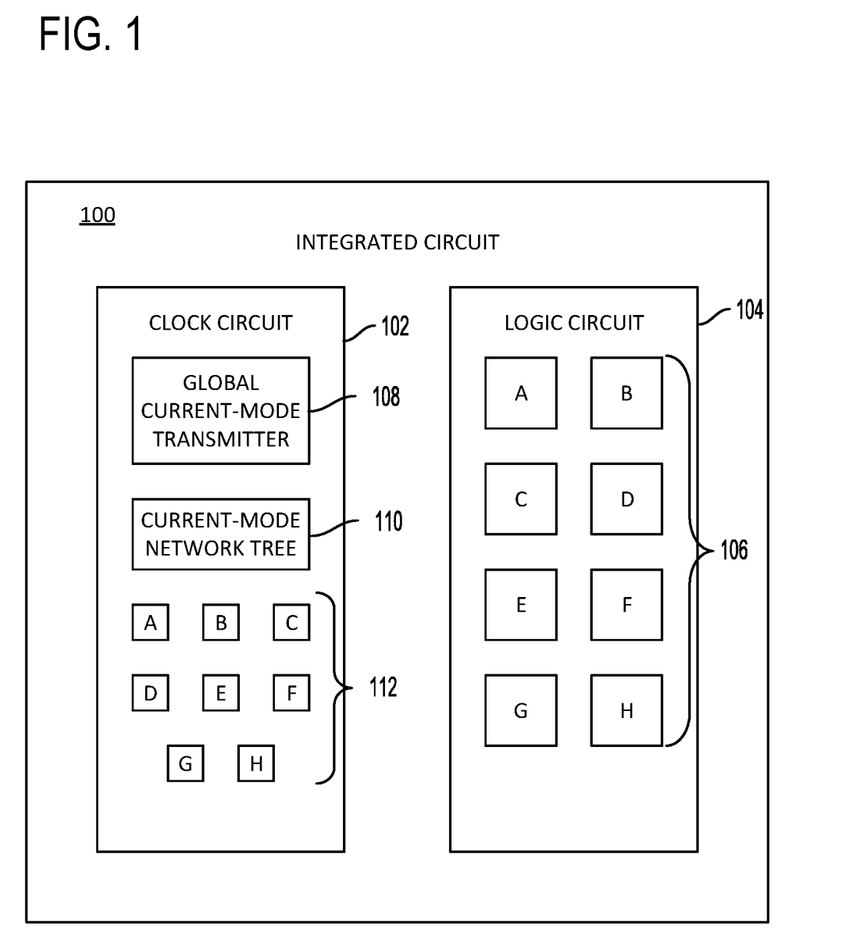
FIG. 1 illustrates an example integrated circuit according to an embodiment of the current invention.

FIG. 1 illustrates an example of an integrated circuit 100 according to an embodiment of the current invention. Within the integrated circuit 100 is a clock circuit 102 and a logic circuit 104. The logic circuit 104 is operatively synchronized with the clock circuit 102. "Operatively synchronized" means that the various logic devices within the logic circuit 104 are configured to operate in a synchronized manner using a clock from the clock circuit 102. The logic circuit 104 is made of multiple sub-circuits 106. These sub-circuits 106 may be symmetrical or may be asymmetrical.

The clock circuit 102 includes a global current-mode transmitter 108 that inputs a current-mode clock into a current-mode network tree 110. The current-mode network tree 110 distributes the current-mode clock to current-mode-to-voltage-mode converters 112. The current-mode-to-voltage-mode converters convert the current-mode clock to a voltage-mode clock for local distribution in the sub-circuits 106 of the logic circuit 104. Each of the current-mode-to-voltage-mode converters 112 is associated with a respective sub-circuit 106 of the logic circuit 104. For example, the "A" current-mode-to-voltage-mode converter 112 is associated with the "A" sub-circuit 106, the "B" with the "B," etc.

Figure 2:
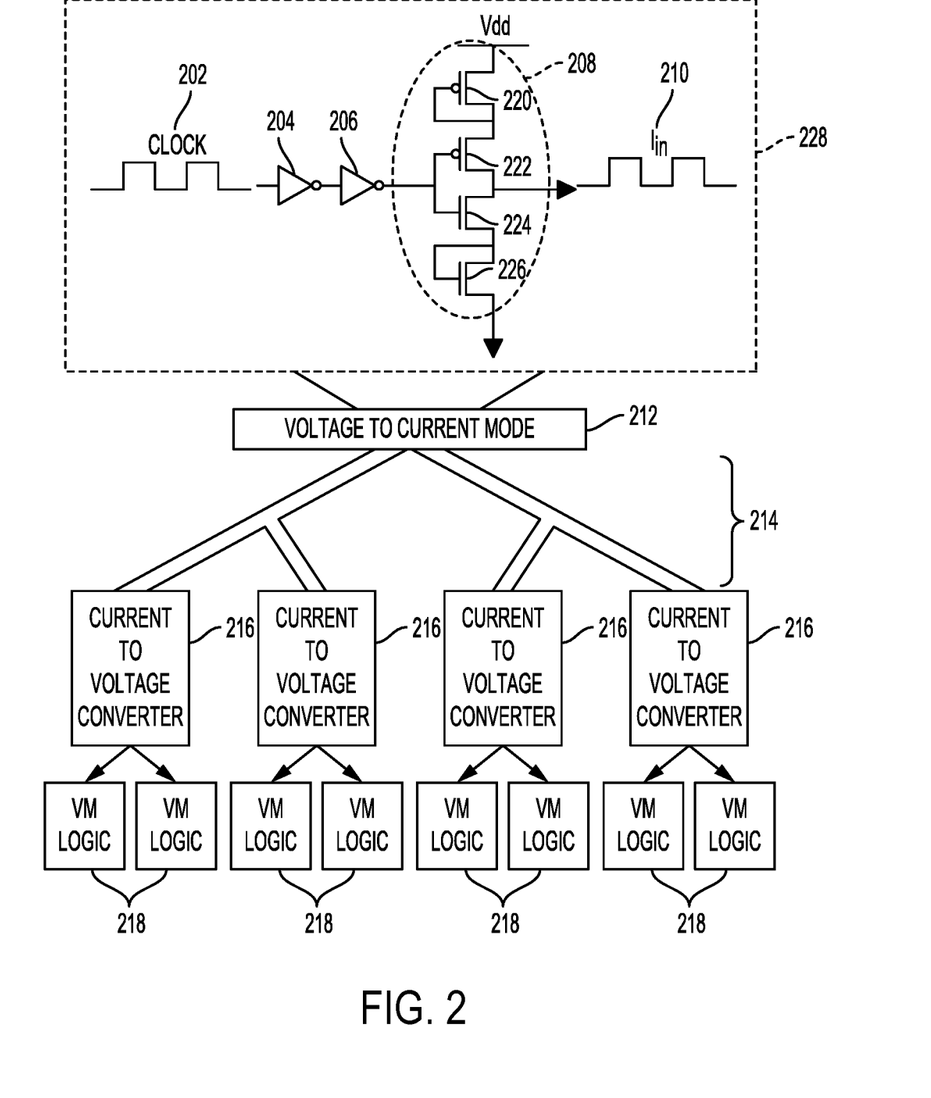
FIG. 2 illustrates an example hybrid CDN using both VM and CM according to an embodiment of the current invention.

FIG. 2 illustrates an example hybrid CDN using both VM and CM according to an embodiment of the current invention. In this example, there is a pulsed current Tx circuit 212 at the root of the clock, which drives a CM clock throughout the IC; a bufferless global network 214 which distributes the CM clock to multiple sub-circuits on the IC; multiple Rx circuits 216, each of which convert the CM clock to a local VM clock; and a buffered local clock network 218 to drive sequential elements. The pulsed current Tx circuit 212, a detailed example 228 of which is provided at the top of FIG. 2, receives a conventional VM clock 202. In this example, the pulsed current Tx circuit 228 amplifies 204 the clock signal 202, inverts 206 the resulting signal, and subjects the signal to a driver circuit 208, resulting in a CM clock output 210.

In some configurations, this CM clock 202 can be received from a frequency divider at the root of the clock tree while the global clock network is held at a nearly constant voltage. Because a symmetric clock tree 214 has equal impedances in each branch, the current can be distributed equally to each Rx circuit 216. The local clock networks associated with each Rx circuit 216 and the associated VM logic 218 often uses the local clock distribution network to mitigate the skew issue of high-performance microprocessors. In such cases, the Rx circuit 216 for each sub-circuit can be employed such that the whole network can be divided into uniform sector clocks.

The disclosed hybrid scheme uses a simpler Tx circuit than previously disclosed CM clocking schemes (e.g. Tx circuit 212, shown at the top of FIG. 2). The transistors 220, 226 immediately connected to $V_{dd}$ and Ground limit the peak current and reduce the interconnect voltage swing. However, the Tx circuit needs to be properly sized to ensure that it can provide an alternating pulsed current into the clock network 214 and distribute the required amount of current to each Rx circuit 216. As part of that sizing, the buffers within the Tx circuit can be selected to be strong enough to drive the "middle" transistor pair 222, 224 of the Tx circuit, resulting in a CM clock output 210. It should be noted, however, that the general concepts of the current invention are not limited to only this example.

In the Tx circuit 212, transistors 220, 226 are in saturation mode due to their gate-drain connections. On the falling edge of the input clock signal 202, transistor 222 is "ON," transistor 224 is "OFF," and the Tx circuit 228 sends a "push" current into the global CM CDN 214. On the other hand, when the clock signal 202 is high, transistor 224 is "ON," transistor 222 is "OFF," and the Tx circuit 228 sends a "pull" current into the global CM CDN 214. The sizing of the transistors 222, 224 determines the near constant voltage of the interconnect 214, and sets the required biased voltage of the Rx circuits 216.

It is noted that the "edges" of the signals received can be changed based on specific configurations, and should be interpreted as examples only unless expressly excluded. A "rising" current edge means that current is being received by the Rx circuit/pushed by the Tx circuit. A "falling" current edge at the Rx circuit means that the Tx circuit is pulling current. Likewise, the respective saturations of the transistors can be modified according to known principles without changing the nature of operation.

The hybrid clocking systems configured according to this disclosure can rely on a single Tx circuit 228, 212 for a given IC, where the critical root wire carries the total current that is distributed to all of the branches within the CM CDN 214. Therefore, the sizing of the global CM CDN wires that determine the wire resistance is important to ensure undistorted input current for each Rx circuit 216. Sizing determinations must consider wire width, particularly the associated effects of electromagnetism of the wires when carrying the total current at the root node of the CDN 214 network.

The Rx circuits 216 receive the alternating current from the Tx circuit 212, 228 and convert the clock signal into a full swing voltage. The local VM clock network for each sub-circuit is buffered and optimized for an output CLK signal. In this example, the local VM CLK signal has a slew rate of less than 10% of the clock period, which may be considered to be the typical slew rate bound in a high-performance clock network design.

Figure 3:
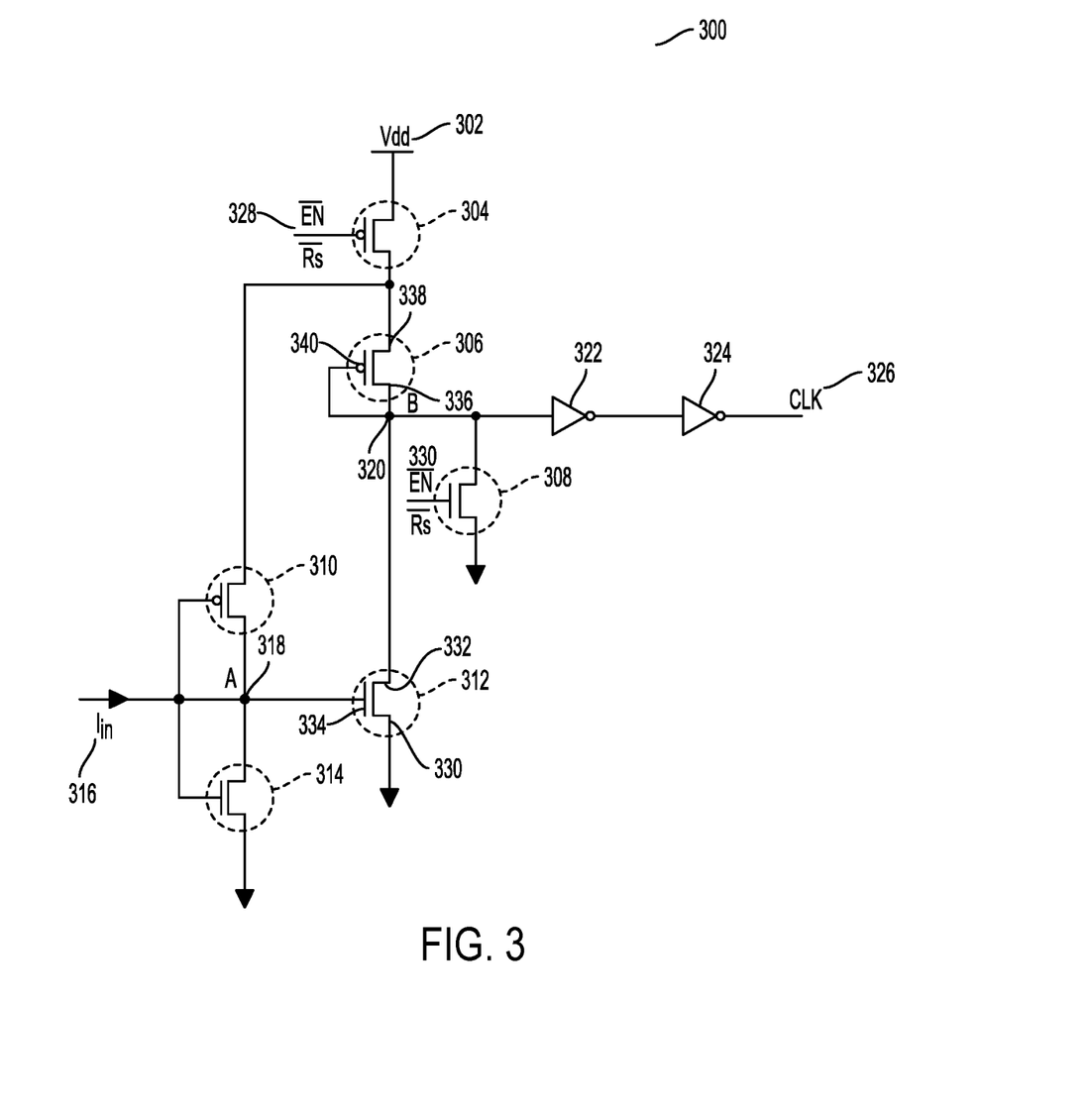
FIG. 3 illustrates an example CM to VM converter circuit according to an embodiment of the current invention.

FIG. 3 illustrates a CM to VM converter circuit 300, the "CM Rx circuit." The Rx circuit illustrated consists of a diode-connected inverter 310, 314, an active-load common-source (CS) amplifier 322, and an output inverter 324. The Rx circuit 300 can efficiently produce a 50% duty-cycle output voltage (CLK) 326, utilizing a 50% duty-cycle input current ($I_{in}$) 316 input into the circuit at node A 318.

The operation of the example CM Rx circuit 300 is as follows. The current signal $I_{in}$ 316 from the clock network is fed to the low-impedance node A 318. The direction of $I_{in}$ 316 determines the gate-to-source voltage ($V_{GS}$) of a first transistor 312. In the illustrated configuration when current $I_{in}$ 316 is received by the Rx circuit 300 (i.e., a rising edge of $I_{in}$ 316 is received), the current between the first transistor 312 and a second transistor 306 is reduced, and the constant current-load at the second transistor 306 increases the node B 320 voltage (which is the voltage at the source 336 and gate 340 of the second transistor 306, and the voltage at the drain 332 of the first transistor 312).

When current $I_{in}$ 316 is pulled from the Rx circuit 300 (i.e., a falling edge of $I_{in}$ 316 is received), the voltage at node A 318 increases, which increases the $V_{GS}$ of the first transistor 312. As a consequence, the current between the first transistor 312 and the second transistor 306 increases and the node B 320 voltage drops by discharging the load-capacitance.

The increases and decreases of the voltage at node B 320 are input into the amplifier 322, resulting in a voltage swing at a CMOS (Complementary Metal Oxide Semiconductor) logic level. The output inverter 324 helps the Rx circuit 300 to drive the output load or the clock buffer within a local VM sub-circuit (such as sub-circuits 106 in FIG. 1).

The enable/reset (EN/RS) 328, 330 signal functions to enable and reset the circuit 300. The enable/reset (EN/RS) 328, 330 signal can also assist in saving static power. For example, the EN signal can decouple $V_{dd}$ 302 using transistor 312. Likewise, in an active-mode, the Rx circuit can have a 19.4 uA leakage current, which is significantly higher than the inactive-mode leakage current of 4.9 uA. In addition, a transistor 308 can be used to pull down node B 320 to ground to prevent unintentional output voltage swings due to noise.

To describe the Rx circuit 300 another way, the Rx circuit 300 can act as an active-load common-source amplifier having: a first transistor 312 with a first source 330 and a first drain 332; a second transistor 306 with a second source 320; and a current conducting from said second source 320 to said first drain 330, wherein said current-mode network tree is electrically connected to said active-load common-source amplifier such that: (1) when said current-mode network tree drives current 316 into said active-load common-source amplifier, a gate-source 334, 330 voltage across said first transistor 312 drops, and when said gate-source 334, 330 voltage across said first transistor 312 drops, said current from said second source 336 to said first drain 330 remains constant, causing an increase in voltage at said first drain 332 (as well as at the second source 336, the second gate 340, and node B 320); and (2) when said current-mode network tree pulls current 316 from said active-load common-source amplifier, said gate-source 334, 330 voltage across said first transistor 312 increases, and when said gate-source 334, 330 voltage across said first transistor 312 increases, said current from said second source 336 to said first drain 332 increases and said voltage at said first drain 332 (as well as at the second source 336, the second gate 340, and node B 320) drops, said voltage at said first drain being at least one of a voltage mode clock 326 or a basis for said voltage mode clock specific to each respective sub-circuit on an IC.

Figure 4:
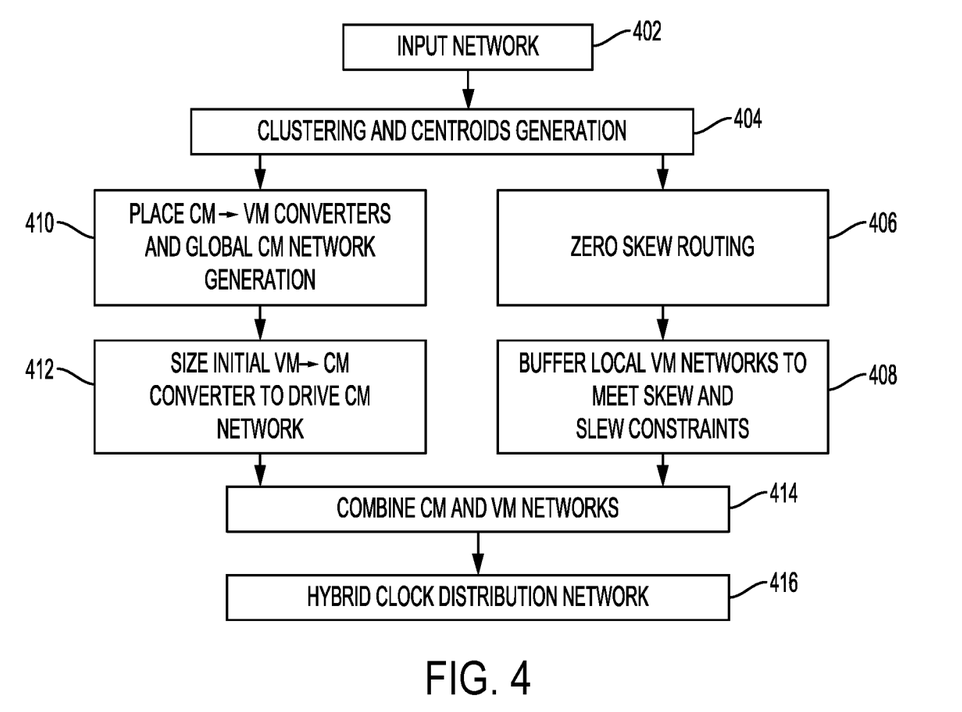
FIG. 4 illustrates a first example method for generating a hybrid CDN.

FIG. 4 illustrates a first example method for generating a hybrid CDN. Existing clock synthesis tools work only with VM clock signals. The methodology illustrated in FIG. 4 and described herein provides for hybrid clock networks. This methodology can utilize existing VM algorithms in the local networks (sub-circuits within the IC), but the clustering and routing of the CM clock signals as disclosed herein can improve the global CDN robustness and power efficiency. The disclosed method takes, as input, any given clock distribution network for an IC (402), and generates a global CM CDN with local buffered VM CDNs for sub-circuits, thereby generating a hybrid CDN (416).

First, the methodology clusters the given network and generates centroids based on Cartesian coordinates (404). For this, a k-means clustering algorithm can be used. For a given number of sinks (VM logic components) ($xs_1$, $xs_2$, ..., $xs_n$), the algorithm partitions the n sinks into k ($\leq$n) sets/clusters S={$S_1$, $S_2$, ..., $S_k$}, and tries to minimize the within-cluster sum of squats. This can be mathematically expressed as $$\arg\min S = \sum_{i=1}^{k} \sum_{xs_j \in S_i} \|xs_j - \mu_i\|^2$$

where $\mu_i$ is the mean of the points within the cluster $S_i$. The k-means clustering algorithm identifies the centroids of each cluster. Then, the methodology divides the flow into two parallel paths. The left path 410, 412 generates the global CM CDN, while the right path 406, 408 generates the local buffered VM network for each respective sub-circuit. After constructing both the CM and VM networks, the respective networks are combined 414 by connecting the roots for each cluster to the outputs of the corresponding Rx circuit, to build the hybrid CDN 416.

The process by which the CM network is generated can be summarized by placing CM-VM converters associated with each respective cluster, and generate a global CM CDN (410). The system then sizes the initial VM-CM converter (the Tx circuit) which will drive the CM CDN (412). The process by which the respective VM networks for each cluster are generated can be summarized by performing zero skew routing (406), then buffering local VM networks to meet skew and slew constraints (408).

The following algorithm is an example of coding which can be used to implement this methodology. As an input, the algorithm takes a clock tree (Tree) and the slew constraint (SL). The output of the algorithm is the hybrid CDN. The algorithm starts with clustering methodology that divides the given network into a global tree (used for the CM CDN) and at least one local tree (line 3). Similar to CDN synthesis using timing-model-independent buffered clock-tree synthesis (BCTS), the local trees use common connection lengths to each cluster, to build an equal-height tree (EHT), then buffers the local VM network to meet the slew-constraint. As a result, the local trees have a common insertion delay.

The global tree is an equal-impedance CM network that assigns equal height to each level using the centroids of the clusters. Then the algorithm places an Rx circuit to each centroid (sub-circuit) and computes the total admittance of the network for initial Tx circuit sizing, running the transient simulation to extract initial skew (lines 8-12). For total admittance computation, the global CM CDN and the Rx circuits input admittances are used. Then the algorithm recursively sizes up or down from the initial Tx circuit sizing ($T_{init}$) to extract the lowest or the best skew in lines 13-20. Similar to CMOS sizing, the Tx circuit sizing problem is convex, and for the increment or decrement the sizing steps can use pre-determined step sizes. For example, the sizes of the increments or decrements may be 1%, 5%, other percentages, or can be fixed increments/decrements. The hybrid-CDN is then constructed by connecting the roots of each cluster to the outputs of the corresponding CM Rx circuit, to extract power-performance in line 21. This algorithm provides an advantage over previous methodologies in that it can provide a hybrid CDN for both asymmetric and symmetric CDNs.

Example Hybrid CDN Algorithm:

```
 1: Input: clock tree (Tree), slew-constraint (S_L);
 2: Output: Hybrid CDN;
 3: (GloTree(GT), LocTree(LT)) = Clustering(Tree);
 4: //Local buffered VM network
 5: BCTS = EHT(LT);           // Equal-height tree generation
 6: BufferSizing(BCTS);       // Buffer sizing to meet S_L
 7: //Global CM network
 8: RxPlacement(GT);
 9: Y_T^G = TotalAdmittance(GT);
10: T_init = SizeTransmitter(Y_T^G);
11:    TransientSimiluation;
12:    S_init^G = CalculateSkew( );
13: S_new^G = S_best^G = S_init^G, T_best = T_newUp = T_newDown = T_init;
14: while S_new^G ≤ S_best^G do        // repeat if improvement or equal
15:    Recursively size up (T_newUp = T_newUp + δs) and extract(S_best^G
          and T_best)
       // δs is the 1% or other % of T_init on the first pass, sizing up
16: end while
17: S_new^G = S_init^G;
18: while S_new^G ≤ S_best^G do        // repeat if improvement or equal
19:    Recursively size down (T_newup = T_newUp + δs) and extract(S_best^G
          and T_best)
20: end while
21: HCDN = Combine(GT, LT);
```

Figure 5:
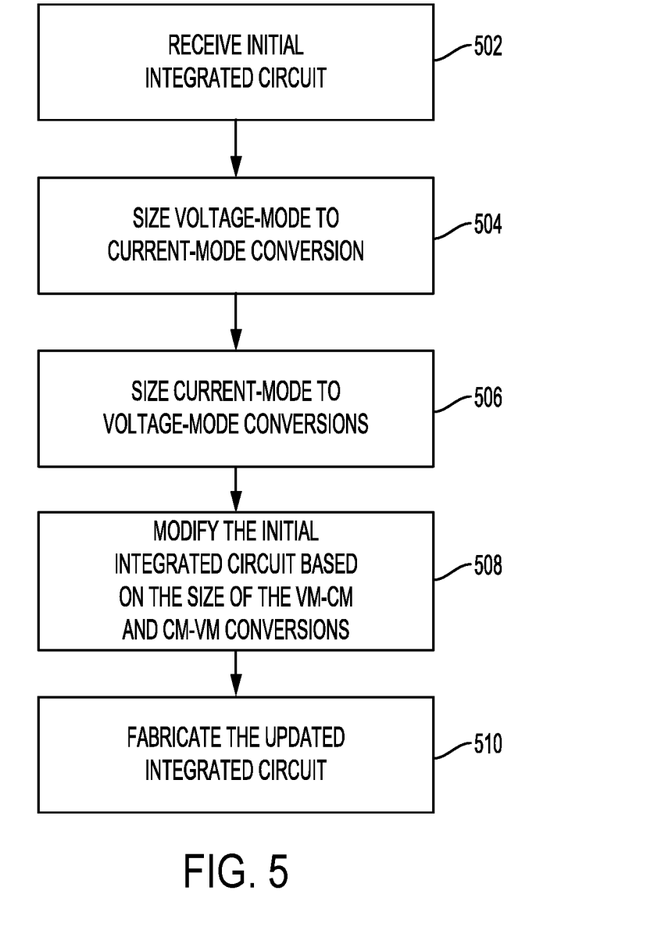
FIG. 5 illustrates a second example method for generating a hybrid CDN.

FIG. 5 illustrates a second example method for generating a hybrid CDN. In this example, the system receives an initial integrated circuit (502) having VM logic components. The system sizes the VM to CM conversion (the Tx circuit) (504). The system also sizes the respective CM to VM conversions for each sub-circuit (the Rx circuits) (506). The system modifies the initial integrated circuit based on the sizes of the VM-CM and CM-VM conversions (508), and initiates fabrication of the updated integrated circuit (510).

Figure 6:
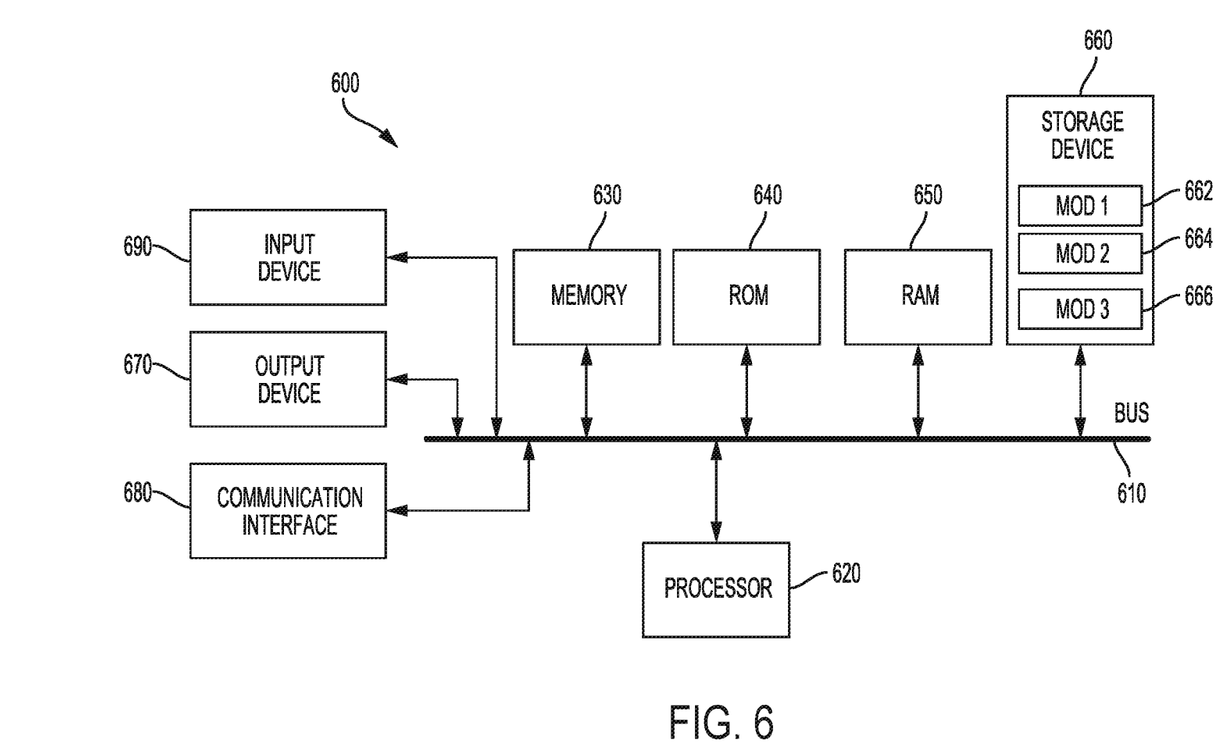
FIG. 6 illustrates an example computer system.

With reference to FIG. 6, an example system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the example embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the example operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Having described the Figures, examples of systems, integrated circuits, and methods are provided. An example integrated circuit can include: a clock circuit; and a logic circuit operatively synchronized with said clock circuit, wherein said logic circuit can include a plurality of sub-circuits, wherein said clock circuit can include: a current-mode network tree; a plurality of current-mode-to-voltage-mode converters, each current-mode-to-voltage-mode converter in said plurality of current-mode-to-voltage-mode converters being electrically connected to said current-mode network tree, and each current-mode-to-voltage-mode converter in said plurality of current-mode-to-voltage-mode converters being associated with a respective one of said plurality of sub-circuits; and a global current mode transmitter electrically connected to said current-mode network tree, wherein said global current mode transmitter provides a current-mode clock signal to each of said plurality of current-mode-to-voltage-mode converters. In such a configuration, said clock circuit can further include a plurality of voltage-mode network trees, each voltage-mode network tree in said plurality of voltage-mode network trees being associated with a respective one of said plurality of sub-circuits, and a plurality of buffers associated with each of said plurality of sub-circuits, wherein said plurality of buffers are configured to adjust skew and jitter of each of said plurality of sub-circuits. Likewise, each current-mode-to-voltage-mode converter in said plurality of current-mode-to-voltage-mode converters can be configured such that, upon receiving an edge of current from said current-mode network tree, produces a voltage edge by triggering a change in current load on a transistor.

In such configurations, each current-mode-to-voltage-mode converter in said plurality of current-mode-to-voltage-mode converters can include: an active-load common-source amplifier having: a first transistor with a first source and a first drain; a second transistor with a second source; and a current conducting from said second source to said first drain, wherein said current-mode network tree is electrically connected to said active-load common-source amplifier such that: (1) when said current-mode network tree drives current into said active-load common-source amplifier, a gate-source voltage across said first transistor drops, and when said gate-source voltage across said first transistor drops, said current from said second source to said first drain remains constant, causing an increase in voltage at said first drain; and (2) when said current-mode network tree pulls current from said active-load common-source amplifier, said gate-source voltage across said first transistor increases, and when said gate-source voltage across said first transistor increases, said current from said second source to said first drain increases and said voltage at said first drain drops, said voltage at said first drain being at least one of a voltage mode clock or a basis for said voltage mode clock specific to each respective sub-circuit. Continuing further, each current-mode-to-voltage-mode converter in said plurality of current-mode-to-voltage-mode converters can further include: an enable/reset signal electrically connected to a third gate of a third transistor having a third drain electrically connected to said first drain, said third transistor having a third source electrically connected to ground. This enable/reset signal, and the third transistor, can prevent unintentional output voltage swings due to noise in said voltage mode clock.

This example integrated circuit can be modified such that each current-mode-to-voltage-mode converter in said plurality of current-mode-to-voltage-mode converters further includes: an inverted amplifier which receives changes in said voltage at said first drain as inputs, then amplifies said changes, to yield an inverted amplified voltage-mode clock; and an output inverter which inverts said inverted amplified voltage-mode clock into said voltage mode clock. Likewise, the electrical connection between said global current mode transmitter and each current-mode-to-voltage-mode converter in said plurality of current-mode-to-voltage-mode converters can include a diode-connected inverter.

The concepts disclosed herein can be applied to both asymmetrical and symmetrical integrated circuits. For example, the sub-circuits within the integrated circuit can be symmetrical or asymmetrical with respect to each other. Likewise, the current-mode network tree, and specifically the branches of the current-mode network tree leading to respective sub-circuits, can be symmetrical or asymmetrical.

An example method according to the concepts disclosed herein can include: receiving, at a processor, a clock tree circuit, said clock tree circuit identifying centroid locations within an integrated circuit design of a plurality of circuit components requiring a voltage clock input; receiving, at said processor, a slew constraint; dividing said clock tree circuit into a local tree and a global tree; generating, using said local tree and common connection length between locations of said plurality of circuit components, an equal height tree; buffering a local voltage-mode network associated with said local tree based on said equal height tree, to yield a buffered clock-tree synthesis; assigning, for each centroid location in said centroid locations, an equal height level for a current-mode clock distribution through said global tree; placing a current-mode to voltage-mode receiver at each centroid location in said centroid locations, to yield current-mode to voltage-mode receiver placements; recursively computing a total admittance and a skew value for said integrated circuit design with said current-mode to voltage-mode receiver placements by varying current-mode inputs to respective current-mode to voltage-mode receiver placements until a lowest skew is found, at which point said current-mode inputs for that iteration are identified, to yield identified current-mode inputs; connecting, via said processor and within said integrated circuit design, each centroid location to a corresponding RX placement using said identified current-mode inputs and said slew constraint. In such an example method, recursively computing of said total admittance and said skew value can further include, for each iteration: computing said total admittance of said integrated circuit design using variable input admittances for said RX placements; performing a transient simulation on said integrated circuit design using said current-mode to voltage-mode receiver placements and said total admittance for said iteration, to yield said skew value; and comparing said skew value to previously recorded skew values.

In some configurations of this method, the clock tree circuit can be an asymmetrical design, whereas in other it can be for a symmetrical design. In addition, this example method can be further expanded such that connecting each centroid location to said corresponding RX placement further uses, as inputs, said global tree and said local tree.

Another example method for creating a hybrid clock distribution network can include: identifying, via a processor and for an initial integrated circuit, a voltage-mode clock; sizing, via said processor and for said initial integrated circuit, a conversion of said voltage-mode clock to a current-mode clock for distribution through an H-tree current-mode network on said initial integrated circuit, to yield a transmission circuit size; sizing, via said processor and for said initial integrated circuit and based on said transmission circuit size, conversions of said current-mode clock to localized voltage-mode clocks for respective sub-circuits of individual voltage-mode flip-flops on said initial integrated circuit, to yield a receiver circuit size; modifying, via said processor, said initial integrated circuit based on said transmission circuit size and said receiver circuit size, to yield an updated integrated circuit; and fabricating said updated integrated circuit.

In such a method, said conversions of said current-mode clock to localized voltage-mode clocks can be performed by current-mode-to-voltage-mode converters being electrically connected to said H-tree current-mode network, and each current-mode-to-voltage-mode converter in said current-mode-to-voltage-mode converters being associated with a respective one of said respective sub-circuits.

In some configurations of this method, said H-tree current-mode network can further include: a plurality of voltage-mode network trees, each voltage-mode network tree in said plurality of voltage-mode network trees being associated with one of said respective sub-circuits; and a plurality of buffers associated with each of said respective sub-circuits, wherein said plurality of buffers are configured to adjust skew and jitter of each of said respective sub-circuits.

In some configurations of this method, each conversion of said current-mode clock to said localized voltage-mode clocks can include a diode-connected inverter. Likewise, each conversion of said current-mode clock to said localized voltage-mode clocks can include: upon receiving a current edge from said H-tree current-mode network, producing a corresponding voltage edge by triggering a change in current load on a transistor. In such configurations, said change in current load can cause a change in a voltage on an output. Moreover, said change in said voltage on said output can be inverted from said current from said H-tree current-mode network.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An integrated circuit, comprising:
a clock circuit; and
a logic circuit operatively synchronized with said clock circuit, wherein said logic circuit comprises a plurality of sub-circuits,
wherein said clock circuit comprises:
a current-mode network tree;
a plurality of current-mode-to-voltage-mode converters, each current-mode-to-voltage-mode converter in said plurality of current-mode-to-voltage-mode converters being electrically connected to said current-mode network tree, and each current-mode-to-voltage-mode converter in said plurality of current-mode-to-voltage-mode converters being associated with a respective one of said plurality of sub-circuits; and
a global current mode transmitter electrically connected to said current-mode network tree, wherein said global current mode transmitter provides a current-mode clock signal to each of said plurality of current-mode-to-voltage-mode converters.

2. The integrated circuit according to claim 1, wherein said clock circuit further comprises:
a plurality of voltage-mode network trees, each voltage-mode network tree in said plurality of voltage-mode network trees being associated with a respective one of said plurality of sub-circuits; and
a plurality of buffers associated with each of said plurality of sub-circuits, wherein said plurality of buffers are configured to adjust skew and jitter of each of said plurality of sub-circuits.

3. The integrated circuit according to claim 1, wherein each current-mode-to-voltage-mode converter in said plurality of current-mode-to-voltage-mode converters is configured such that, upon receiving an edge of current from said current-mode network tree, produces a voltage edge by triggering a change in current load on a transistor.

4. The integrated circuit according to claim 1, wherein each current-mode-to-voltage-mode converter in said plurality of current-mode-to-voltage-mode converters comprises:
an active-load common-source amplifier having:
a first transistor with a first source and a first drain;
a second transistor with a second source; and
a current conducting from said second source to said first drain, wherein said current-mode network tree is electrically connected to said active-load common-source amplifier such that:
(1) when said current-mode network tree drives current into said active-load common-source amplifier, a gate-source voltage across said first transistor drops, and when said gate-source voltage across said first transistor drops, said current from said second source to said first drain remains constant, causing an increase in voltage at said first drain; and
(2) when said current-mode network tree pulls current from said active-load common-source amplifier, said gate-source voltage across said first transistor increases, and when said gate-source voltage across said first transistor increases, said current from said second source to said first drain increases and said voltage at said first drain drops, said voltage at said first drain being at least one of a voltage mode clock or a basis for said voltage mode clock specific to each respective sub-circuit.

5. The integrated circuit according to claim 4, wherein each current-mode-to-voltage-mode converter in said plurality of current-mode-to-voltage-mode converters further comprises:
an enable/reset signal electrically connected to a third gate of a third transistor having a third drain electrically connected to said first drain, said third transistor having a third source electrically connected to ground.

6. The integrated circuit according to claim 5, wherein said third transistor prevents unintentional output voltage swings due to noise in said voltage mode clock.

7. The integrated circuit according to claim 4, wherein each current-mode-to-voltage-mode converter in said plurality of current-mode-to-voltage-mode converters further comprises:
an inverted amplifier which receives changes in said voltage at said first drain as inputs, then amplifies said changes, to yield an inverted amplified voltage-mode clock; and
an output inverter which inverts said inverted amplified voltage-mode clock into said voltage mode clock.

8. The integrated circuit according to claim 1, wherein the electrical connection between said global current mode transmitter and each current-mode-to-voltage-mode converter in said plurality of current-mode-to-voltage-mode converters comprises a diode-connected inverter.

9. The integrated circuit according to claim 1, wherein said plurality of sub-circuits are asymmetrical with respect to each other.

10. The integrated circuit according to claim 1, wherein said current-mode network tree is an asymmetric current-mode network tree.

11. A method to create a hybrid clock distribution network, comprising:
receiving, at a processor, a clock tree circuit, said clock tree circuit identifying centroid locations within an integrated circuit design of a plurality of circuit components requiring a voltage clock input;
receiving, at said processor, a slew constraint;
dividing said clock tree circuit into a local tree and a global tree;
generating, using said local tree and common connection length between locations of said plurality of circuit components, an equal height tree;
buffering a local voltage-mode network associated with said local tree based on said equal height tree, to yield a buffered clock-tree synthesis;
assigning, for each centroid location in said centroid locations, an equal height level for a current-mode clock distribution through said global tree;
placing a current-mode to voltage-mode receiver at each centroid location in said centroid locations, to yield current-mode to voltage-mode receiver placements;
recursively computing a total admittance and a skew value for said integrated circuit design with said current-mode to voltage-mode receiver placements by varying current-mode inputs to respective current-mode to voltage-mode receiver placements until a lowest skew is found, at which point said current-mode inputs for that iteration are identified, to yield identified current-mode inputs;
connecting, via said processor and within said integrated circuit design, each centroid location to a corresponding RX placement using said identified current-mode inputs and said slew constraint.

12. The method of claim 11, wherein recursively computing of said total admittance and said skew value further comprises, for each iteration:
computing said total admittance of said integrated circuit design using variable input admittances for said RX placements;
performing a transient simulation on said integrated circuit design using said current-mode to voltage-mode receiver placements and said total admittance for said iteration, to yield said skew value; and
comparing said skew value to previously recorded skew values.

13. The method of claim 11, wherein said clock tree circuit is an asymmetrical design.

14. The method of claim 11, wherein said clock tree circuit is a symmetrical design.

15. The method of claim 11, wherein connecting each centroid location to said corresponding RX placement further uses, as inputs, said global tree and said local tree.

16. A method to create a hybrid clock distribution network, comprising:
identifying, via a processor and for an initial integrated circuit, a voltage-mode clock;
sizing, via said processor and for said initial integrated circuit, a conversion of said voltage-mode clock to a current-mode clock for distribution through an H-tree current-mode network on said initial integrated circuit, to yield a transmission circuit size;
sizing, via said processor and for said initial integrated circuit and based on said transmission circuit size, conversions of said current-mode clock to localized voltage-mode clocks for respective sub-circuits of individual voltage-mode flip-flops on said initial integrated circuit, to yield a receiver circuit size;
modifying, via said processor, said initial integrated circuit based on said transmission circuit size and said receiver circuit size, to yield an updated integrated circuit; and
fabricating said updated integrated circuit.

17. The method of claim 16, wherein said conversions of said current-mode clock to localized voltage-mode clocks are performed by current-mode-to-voltage-mode converters being electrically connected to said H-tree current-mode network, and each current-mode-to-voltage-mode converter in said current-mode-to-voltage-mode converters being associated with a respective one of said respective sub-circuits.

18. The method of claim 16, wherein said H-tree current-mode network further comprises:
a plurality of voltage-mode network trees, each voltage-mode network tree in said plurality of voltage-mode network trees being associated with one of said respective sub-circuits; and
a plurality of buffers associated with each of said respective sub-circuits, wherein said plurality of buffers are configured to adjust skew and jitter of each of said respective sub-circuits.

19. The method of claim 16, wherein each conversion of said current-mode clock to said localized voltage-mode clocks comprises a diode-connected inverter.

20. The method of claim 16, wherein each conversion of said current-mode clock to said localized voltage-mode clocks comprises:
upon receiving a current edge from said H-tree current-mode network, producing a corresponding voltage edge by triggering a change in current load on a transistor.

* * * * *